US009582351B2

(12) United States Patent
Boecker et al.

(10) Patent No.: US 9,582,351 B2
(45) Date of Patent: *Feb. 28, 2017

(54) DEVICE DRIVER ERROR ISOLATION ON DEVICES WIRED VIA FSI CHAINED INTERFACE

(71) Applicant: International Business Machines Corporation, Armonk, NY (US)

(72) Inventors: Douglas M. Boecker, Rochester, MN (US); Christopher L. Bostic, Pflugerville, TX (US); Gaurav Kakkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,032

(22) Filed: Jun. 2, 2015

(65) Prior Publication Data

US 2016/0098311 A1 Apr. 7, 2016

Related U.S. Application Data

(63) Continuation of application No. 14/508,880, filed on Oct. 7, 2014.

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0745* (2013.01); *G06F 11/0772* (2013.01);
(Continued)

(58) Field of Classification Search
CPC ............... G06F 11/079; G06F 11/0751; G06F 11/0787; G06F 17/30395; G06F 17/30477
USPC ............................................... 714/26, 31, 37
See application file for complete search history.

(56) References Cited

U.S. PATENT DOCUMENTS 5,561,760 A 10/1996 Ferris et al.
6,725,396 B2 * 4/2004 Ahrens ................. G06F 11/006
713/2

(Continued)

OTHER PUBLICATIONS

IBM ThinkPad 600X Hardware Maintenance Manual, "Symptom-to-FRU error messages", pp. 17-31 (Jan. 2000).

*Primary Examiner* — Elmira Mehrmanesh
(74) *Attorney, Agent, or Firm* — Joseph J. Petrokaitis; Jack V. Musgrove

(57) ABSTRACT

Fault isolation for a computer system having multiple FRUs in an FSI chain uses logic embedded in a device driver to determine first failure data and a logical error identifier. The logical error identifier represents a hardware logical area of the fault. The fault is then mapped to a segment of the system based on a self-describing system model which includes FRU boundary relationships for the devices. Operation of the device driver is carried out by a flexible service processor. The device driver uses the first failure data to identify a link at a failure point corresponding to the fault and determine a failure type at the link, then maps the link and the failure type to the logical error identifier. After identifying the segment, the device driver can generate a list of callouts of the field replaceable units associated with the segment which require replacement.

8 Claims, 8 Drawing Sheets

(51) Int. Cl.
*G06F 17/30* (2006.01)
*G06F 13/00* (2006.01)

(52) U.S. Cl.
CPC ........ *G06F 13/00* (2013.01); *G06F 17/30395* (2013.01); *G06F 17/30477* (2013.01)

(56) References Cited

U.S. PATENT DOCUMENTS

| | | | |
|---|---|---|---|
| 7,089,461 B2 * | 8/2006 | Gilbert | G06F 11/106 714/47.2 |
| 7,200,525 B1 | 4/2007 | Williams et al. | |
| 7,313,717 B2 * | 12/2007 | Vecoven | G06F 11/0712 714/4.2 |
| 7,752,485 B2 * | 7/2010 | Bavaria | G06F 9/44505 714/2 |
| 7,757,123 B1 | 7/2010 | Gasser et al. | |
| 7,872,982 B2 * | 1/2011 | Atkins | H04L 41/0631 370/242 |
| 8,010,838 B2 * | 8/2011 | Bailey | G06F 11/004 714/10 |
| 8,108,724 B2 * | 1/2012 | Barlow | G06F 11/0727 714/25 |
| 8,230,261 B2 * | 7/2012 | Calkin | G06F 11/0727 714/26 |
| 8,615,680 B2 * | 12/2013 | Boecker | G06F 11/10 714/6.24 |
| 2004/0078634 A1 * | 4/2004 | Gilstrap | G06Q 10/06 714/47.3 |
| 2004/0221198 A1 | 11/2004 | Vecoven | |

* cited by examiner

FIG. 4A

System Model 1

FSP Chip → Planar(FRU) → PCI Adaptor(FRU) → VPD Chip

FIG. 4B

System Model 2

FSP Chip → FSP Card(FRU) → IO Planer (FRU) →
Disk Controller(FRU) → VPD Chip

FIG. 4C

System Model 3

FSP Chip → FSP Card(FRU) → Planar (FRU) →
Fan (FRU) → VPD Chip

*FIG. 5A*

System Model 4

FSP Chip(MRU) → Planar(FRU) → DCM0(FRU) → PROC(MRU) (LINK02) → DCM0(FRU) → Planar(FRU) → DCM1(FRU) → PROC(MRU) (LINK01) → DCM1(FRU) → Planar(FRU) → DIMM (FRU) → VPD Chip (LINK03BUS00)

*FIG. 5B*

System Model 5

FSP Chip(MRU) → FSP_card(FRU) → IO_Planar(FRU) → CPU_Planar(FRU) →DCM0(FRU) → PROC(MRU) (LINK02) → DCM0(FRU) → CPU_Planar(FRU) → DCM1(FRU) → PROC(MRU) (LINK01) → DCM1(FRU) → CPU_Planar(FRU) → DIMM (FRU) →VPD Chip (LINK03BUS00)

*FIG. 5C*

System Model 6

FSP Chip(MRU) → FSP_card(FRU) → System_Node_Planar)(FRU) → Cec_Node_Planar(FRU) → SCM0(FRU) → PROC(MRU) (LINK02) → SCM0(FRU) → Cec_Node_Planar(FRU) → SCM1(FRU) → PROC(MRU) (LINK01) → SCM1(FRU) → Cec_Node_Planar(FRU) → DIMM (FRU) → VPD Chip (LINK03BUS00)

DEVICE DRIVER ERROR ISOLATION ON DEVICES WIRED VIA FSI CHAINED INTERFACE

CROSS-REFERENCE TO RELATED APPLICATION

This application is a continuation of copending U.S. patent application Ser. No. 14/508,880 filed Oct. 7, 2014.

BACKGROUND OF THE INVENTION

Field of the Invention

The present invention generally relates to computer systems, and more particularly to a method of isolating a fault in a complex computer system having a number of serially-connected (FSI chained) devices.

Description of the Related Art

As computer systems become increasingly complex with more interconnected devices, there are ever greater chances of errors arising within the system, and it becomes more difficult to diagnose the cause of these errors. Hardware-based operating errors can result in a period of downtime in which the computer is unavailable for use. For multi-user (or clustering computing environment) computers, such as mainframe computers, midrange computers, supercomputers, and network servers, the inability to use a particular computer may have a significant impact on the productivity of a large number of users, particularly if an error impacts mission-critical applications (e.g., when processing bank transactions). Multi-user computers are typically used around the clock, and as a result, it is critically important that these computers be accessible as much as possible.

Hardware concurrent maintenance is often utilized to address the problems associated with computer downtime. Hardware concurrent maintenance is a process of performing maintenance on computer hardware while the computer is still running, thereby resulting in minimal impact to user accessibility. Conventional hardware concurrent maintenance typically requires that maintenance personnel physically remove one or more field replaceable units (FRUs) from a computer system. FRUs may be packaged in a very complex fashion and/or require special tools to enable removal without causing hardware damage.

Server systems generally have many field replaceable units (FRUs). FIG. 1 depicts one example of a conventional server system 10. In this particular example, the server is controlled by a hardware management console (HMC) 12. HMC 12 is a dedicated workstation that provides a graphical user interface for configuring, operating, and performing basic system tasks for the server, including tasks related to the management of the physical server components and tasks related to virtualization features such as the logical partition configuration or dynamic reconfiguration of resources. HMC 12 communicates with a system controller 14a via an Ethernet connection to an Ethernet controller integrated into the system controller FSP chip. System controller 14a provides system initialization and node management, including error reporting. Inter-device communications may be implemented in server system 10 using a flexible service processor (FSP) located at the system controller. A flexible service processor is similar to a service processor, and may include for example a PowerPC™ processor having engines to drive communications interfaces. A redundant system controller 14b is provided with a point-to-point FSI link between the FSP chips in the system controllers. A plurality of server nodes 16a-16d carry out the main functions of the server, and may constitute a variety of interconnected devices, including multiple processors (primary and support), system memory and cache memories, fabric repeaters, sensors, etc.

FIG. 1 shows how an FSP can have a downstream fanout to other components via a serial link referred to as an FRU support interface (FSI) which is used to reach the endpoint controls (similar interconnections from the FSP in redundant system controller 14b are not shown for simplicity). In this example the endpoints are common FRU access macros (CFAMs) which may be integrated into the microprocessors or other devices such as input/output (I/O) application-specific integrated circuits (ASICs). CFAMs have a standardized interconnect design, and provide FRU support for a variety of control interfaces such as JTAG, UART, I2C (IIC), GPIO, etc. CFAMs can have multiple FSI slaves with a hardware arbiter to allow multiple FSI masters on the support processors, etc., to access the downstream components. The components may be interconnected via multiple CFAMs acting as hubs or links. Hub links are high function links used specifically between processors. Accordingly, instead of an engine in the FSP directly controlling a device, multiple engines linked serially can pass control data to the device (FSI chaining).

In the case of a hardware failure within server system 10, code running on one of the system controllers generates an error log that includes one or more components suspected of being defective (the FRU callout list). A service call is then made to replace hardware associated with those FRUs. A typical FRU callout list includes any FRU having hardware associated with the failure, and may include FRUs that are not actually defective. Typically a platform-specific hard-coded look-up list is used to generate the FRU callout list. This approach is very static. For example, an error's callout may include all associated hardware along a path from a source (e.g., a service processor) to a destination (e.g., a thermal sensor or dual in-line memory module (DIMM)). The FRU callout list would have a minimum of one element with the upper bound determined by the hardware FRU boundaries crossed between the source and destination wiring of the interface.

Another method of generating FRU callout lists is to have the error monitoring application take the industry device driver error number ("errno") and algorithmically try to isolate hardware failures. Often this is done by going to associated hardware (via different methods such as boundary scan or scom) to read hardware registers, states, or status to determine a logical reason for failure. Applications may also try to isolate the failure by communicating to other devices before and after a hub, or on another hub, trying deterministically to limit the FRUs on the callout list.

SUMMARY OF THE INVENTION

The present invention is generally directed to a system, method and/or program product for isolating a fault in a computer system having a plurality of electronic devices which include field replaceable units interconnected via serial links such as FRU support interface (FSI) links. An error is detected using a device driver installed in the computer system which controls one of the electronic devices for which an operation was requested. The device driver analyzes the error using novel fault isolation logic to determine first failure data and a logical error identifier for the error, wherein the logical error identifier represents a hardware logical area of the fault (and is different from the industry standard errno which only represents an error type).

The fault can then be mapped to a segment of the computer system using the first failure data and the logical error identifier based on a self-describing system model for the computer system which is stored in a memory device of the computer system. In the illustrative implementation the self-describing system model includes field replaceable unit boundary relationships for the plurality of interconnected devices. The computer system may include a flexible service processor in communication with the electronic device via a chain of the FSI links, with operation of the device driver being carried out by the flexible service processor. The analysis may be performed by the device driver using the first failure data to identify a link at a failure point corresponding to the fault, and using the first failure data to determine a failure type at the link, then mapping the link and the failure type to the logical error identifier. After identifying the segment, the device driver can generate a list of callouts of the field replaceable units associated with the segment which require replacement. In one embodiment the self-describing system model includes a plurality of tables including a part table uniquely identifying particular parts using a class attribute, an instance table identifying the plurality of devices as specific instances of the parts, a container table representing associations between instances that share a containment relationship, and a connection table associating instances that share a connection relationship, and the callout list is generated by iteratively querying the tables to identify the certain field replaceable units.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

FIGS. 4A-4C are representations of error paths arising in a set of different system models which can result in different fault isolation results in accordance with one implementation of the present invention;

FIGS. 5A-5C are representations of more complex error paths arising in another set of different system models which can also result in different fault isolation results in accordance with one implementation of the present invention;

The use of the same reference symbols in different drawings indicates similar or identical items.

DESCRIPTION OF THE PREFERRED EMBODIMENT(S)

Figure 1:
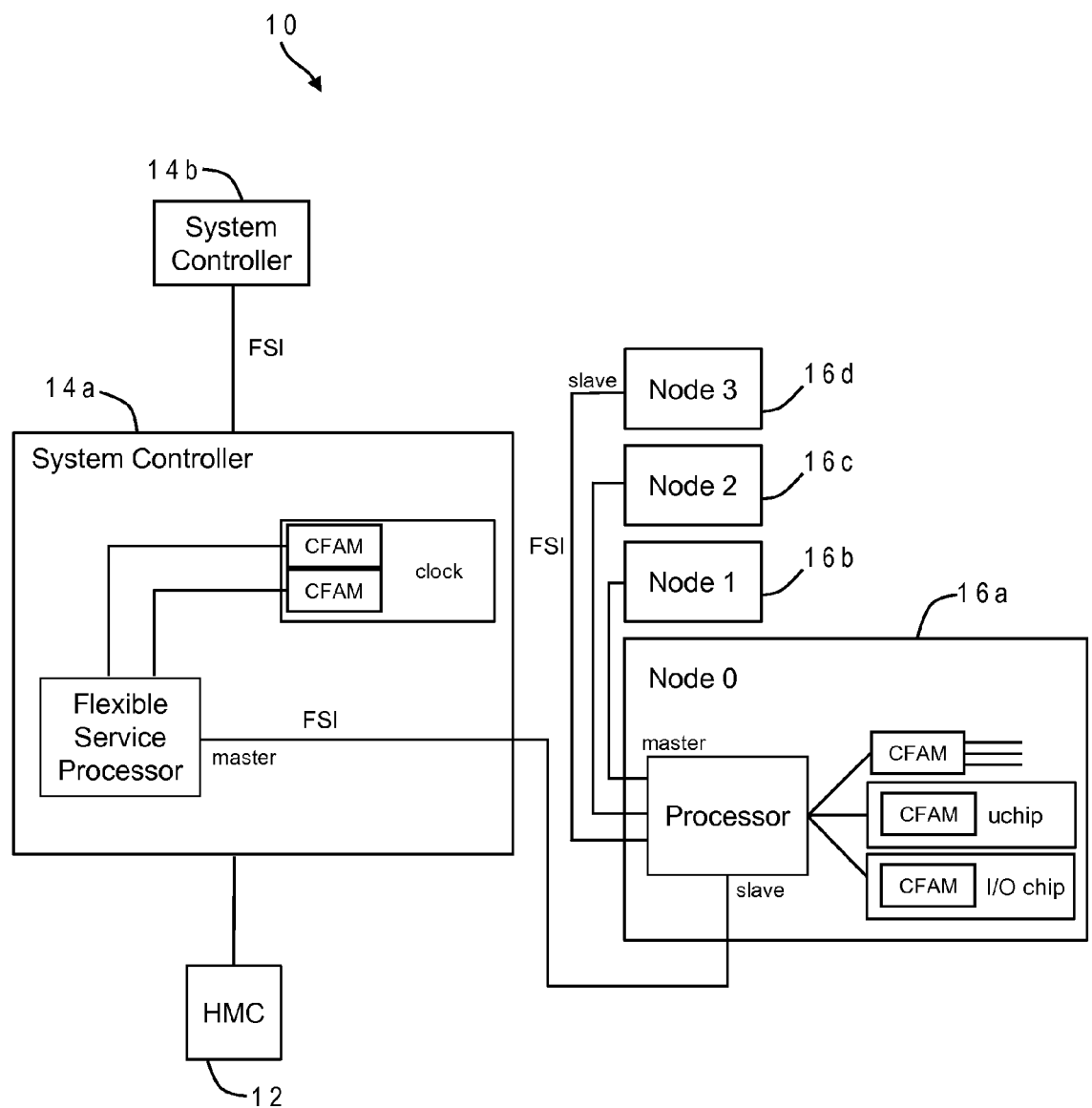
FIG. 1 is a high-level block diagram of a conventional server system, showing how flexible service processors are used in combination with common FRU access macros (CFAMs) to fan out to downstream components.

While methods exist in the prior art to facilitate hardware concurrent maintenance by generating a callout list for replacing FRUs, there are still problems which have become very significant in the context of complicated computer systems have numerous interconnected devices. Use of a platform-specific hard-coded look-up list is straight forward, but lacks algorithmic FRU isolation resulting in more FRU callouts than are actually needed. This method has a lower development cost, but a high field RAS cost (reliability, availability, serviceability). Algorithmic approaches relying solely on the errno value are very expensive to perform. The error path code becomes more involved than the main path code. The result is error path lines of code (LOC) exceeding good path LOC. This type of isolation is also often replicated. For example, a system may have thermal chips, I/O chips, vital product data (VPD) chips, and remove power controllers (RPCs) all on the same interface bus (e.g., IIC). Fault isolation algorithms may be independently implemented by power/thermal applications, LED applications, VPD applications and RPC applications, all needing awareness of the other while striving to be independent. It is advantageous to maintain functional application boundaries and not force applications to be logically lumped due to a shared interface. The desire would be to have applications abstracted from the interface interactions and therefore avoid any intra-component interdependencies. Individual application handling of device interface errors (errno's) is very expensive and inconsistent from application to application.

This problem is compounded by the number of interfaces in a server system. Within a state-of-the-art server system's FSP chip, power system interfaces may include AIO, FSI, GPIO, HOSTDMA, IIC, IICSLV, IOMUX, JTAG, MBX, PSI, RS485, RTC, SCAN, SCOM, SFC, SPI, TONE, and UART devices, and their associated device drivers. Some of these interfaces are point-to-point but others are multi-drop interfaces. Burdening the many users of these interfaces to individually determine FRU callouts is an expensive drain on resources, flash space, and reliability/consistency.

The challenges are further exacerbated with server system designs where the system interfaces are replicated on CFAMs. These CFAMS are embedded on FRUs throughout the system and interconnected to the service processor via FSI connections. To communicate on a simple IIC interface on a POWER8™ system, the communication path may look like: service processor ←FSI→CFAM1←FSI→CFAM2←FSI→CFAM3←IIC→target. Callouts thus are not only dependent on devices involved with the target interface (e.g., IIC) but also must be dependent on hardware involved in chaining the service processor to a CFAM, or CFAM-to-CFAM interim connections. Standard device driver interface error paths do not provide the isolation data to perform FRU isolation for these chained/cascaded interfaces.

Using legacy isolation methods would result in a long list of FRUs or manufacturing replaceable units (MRUs—which require re-soldering but are not considered "field replaceable" by the customer) callouts resulting in high service cost and longer service or failure analysis times. This multi-part callout is not ideal, but has been the norm. The multi-part approach is not effective when a customer is servicing the box. With modern server systems, many more CFAMs are now packaged throughout the system in more and more cascaded configurations. The result is that a majority of the system's FRUs are now wired via cascaded devices, meaning the majority of callouts have a high cost of isolating failure via the legacy methods with no time/resources to implement these legacy methods. The result is more parts in the end-to-end multi-part callout resulting in higher service cost and longer service times.

It would, therefore, be desirable to devise an improved method of fault isolation which is robust enough to efficiently get the FRU callout list built for all the interfaces supported by the FSP and the CFAM engines used within these platform designs. It would be further advantageous if the method could remove the burden of wiring based callout isolation from all the application and put it into the device drivers. The error number (errno) that current POSIX style device driver failures return is not granular enough to isolate the problematic FRUs. Device drivers need to provide more than an errno indication of a failure. The present invention addresses these problems by providing an extended detail referred to as the logical error identifier. Then the logical error identifier along with the targeted device can be used to algorithmically map logical errors using a self-defining system model to determine FRU boundaries and ultimately callouts. Using this method, by the time the application receives the device driver error, all FRU callouts have been determined—thus removing the cost of application fault isolation. This procedure can be implemented for all supported device types (e.g., AIO, FSI, GPIO, HOSTDMA, IIC, IICSLV, IOMUX, JTAG, MBX, PSI, RS485, RTC, SCAN, SCOM, SFC, SPI, TONE, and UART). By making these algorithms be driven by data, rather than platform specific isolations, the invention can ensure that no firmware updates to fault isolation code are required when the next platform is conceived. This approach thus removes the expense of interface fault isolation from all future systems.

As part of this new solution, the device driver can analyze the failure as part of gathering first failure data capture (FFDC) data to determine where within the chained/cascaded device path, the failure occurred. This analysis is summarized into the new logical error identifier used to further detail the industry standard errno. The logical error identifier may isolate the error to a segment of the device path or to a specific interface engine (FSP or CFAM) within the device path. It may also indicate that isolation was not possible. The logical fault identifier can then be used to help map errors to the associated physical assets that build up a system. These "smart" callouts can map the logical segments of the device path to the FRUs involved in the wiring of that segment using non-platform specific algorithms to perform this mapping. Using self describing system models, the error identifier can be mapped to wire segments and FSP/CFAM engines within the data. The data can then self-describe that logical path to a physical path on present hardware. The physical paths can be followed to determine FRU boundaries crossed on the failing segment of the interface, and FRUs involved can be added to the FRU callout list. In the preferred embodiment, the self-describing system model is generated directly from data always available from the hardware team (e.g., from card schematic XMLs, workbooks, etc.) and captured into an embedded system via system model database files. The system model describes the FRU or parts of FRU, along with their interconnection in a hierarchical way. Data mining and analysis in this type of implementation can be accomplished via SQL based queries.

In the illustrative implementation, the device driver logical error identifier can isolate errors to: (i) an FSI connecting link, such as FSP to CFAM (a primary link failure) or CFAM to CFAM (a sub FSI Link or hub FSI link failure), (ii) a CFAM chip, (iii) an FSP chip, (iv) a CFAM internal engine, (v) a CFAM port, (vi) a processor, or (vii) a PSI link. When an error is isolated to a chip, the firmware can determine the packaging of the chip and callout the associated FRU/MRU or other customer replaceable unit (CRU). When an error is isolated to a link, the self-describing model can be used to determine the packaging of the source and destinations of the target link, and callout the associated FRUs. If a logical error identifier cannot be determined, an unknown identifier can be returned, resulting in default FRU callouts for the whole path from source FSP to target device.

Figure 2:
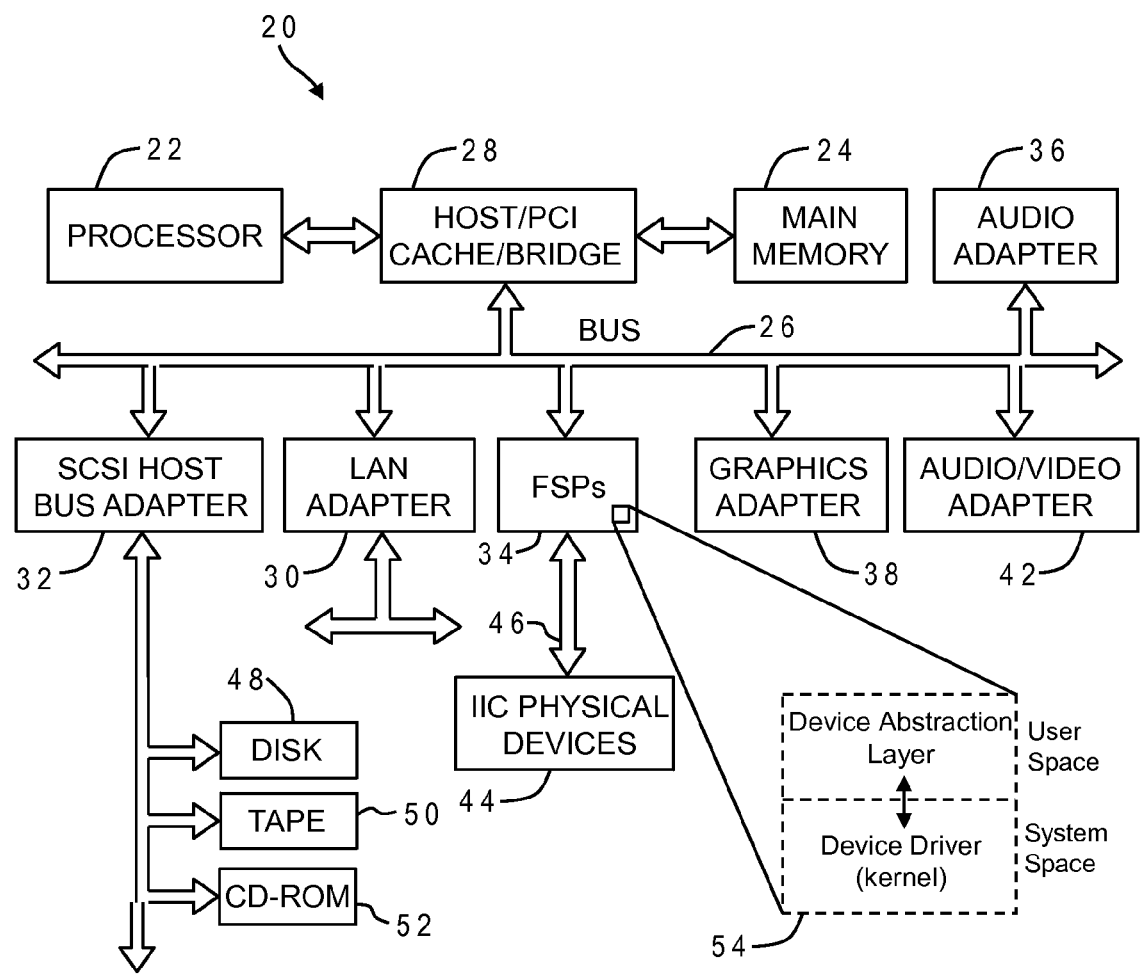
FIG. 2 is a high-level block diagram of one embodiment of a computer client constructed in accordance with the present invention having multiple flexible service processors used to control other physical devices as part of a complex computer system such as a server.

With reference now to the figures, and in particular with reference to FIG. 2, there is depicted one embodiment 20 of a computer system in which the present invention may be implemented. Computer system 20 is one example of a computer in which code or instructions implementing the processes of the present invention may be located. Computer system 20 employs a peripheral component interconnect (PCI) local bus architecture. Although the depicted example employs a PCI bus, other bus architectures such as Accelerated Graphics Port (AGP) and Industry Standard Architecture (ISA) may be used. Processor 22 and main memory 24 are connected to PCI local bus 26 through PCI bridge 28. PCI bridge 28 also may include an integrated memory controller and cache memory for processor 22. Additional connections to PCI local bus 26 may be made through direct component interconnection or through add-in boards.

In the depicted example, local area network (LAN) adapter 30, small computer system interface (SCSI) host bus adapter 32 and flexible service processors 34 are connected to PCI local bus 26 by direct component connection. In contrast, audio adapter 36, graphics adapter 38, and audio/video adapter 42 are connected to PCI local bus 26 by add-in boards inserted into expansion slots. Flexible service processors 34 provide PCI and IIC bus connections. In this example, flexible service processors 34 are connected to inter-internal control physical devices 44 by IIC bus 46. Inter-internal control physical devices 44 may include a variety of components, such as a control panel, a flexible service processor, a power device, and a memory. SCSI host bus adapter 32 provides a connection for hard disk drive 48, tape drive 50, and CD-ROM drive 52. Typical PCI local bus implementations will support three or four PCI expansion slots or add-in connectors.

A given flexible service processor 34 has local memory 54 which includes a system space and a user space. A device driver is loaded into the system space (kernel) to control a particular hardware device of the system, e.g., an IIC device 44. For purposes of the present invention it is preferable to use a device abstraction layer in the user space to interface with the kernel device driver, so the overall device driver function is system independent. According to this implementation, the kernel device driver is responsible for functions such as walking through CFAMs to gather FFDC data from the CFAMs in an error path, and for analyzing the FFDC to determine the logical error identifier, but the device abstraction layer performs functions such as system model analysis. As used in the remainder of this disclosure, "device driver" preferably refers to this device abstraction layer (userspace) and kernel device driver (system space) hybrid.

An operating system runs on processor 22 and is used to coordinate and provide control of various components within computer system 20. The operating system may be a commercially available operating system such as Windows XP, which is available from Microsoft Corporation. Instructions for the operating system and applications or programs are located on storage devices, such as hard disk drive 48, and may be loaded into main memory 24 for execution by processor 22. In the illustrative embodiment, computer system 20 is a client which is used to access a larger system, such as a server. Client 20 may be controlled via a TELNET connection.

Those skilled in the art will appreciate that the hardware of FIG. 2 may vary depending on the implementation. Other internal hardware or peripheral devices, such as flash read-only memory (ROM), equivalent nonvolatile memory, or optical disk drives and the like, may be used in addition to or in place of the hardware depicted. Also, the processes of the present invention may be applied to a multiprocessor data processing system. The depicted example is not meant to imply architectural limitations. For example, data processing system 20 also may be a notebook computer, hand-held computer, PDA, kiosk or Web appliance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
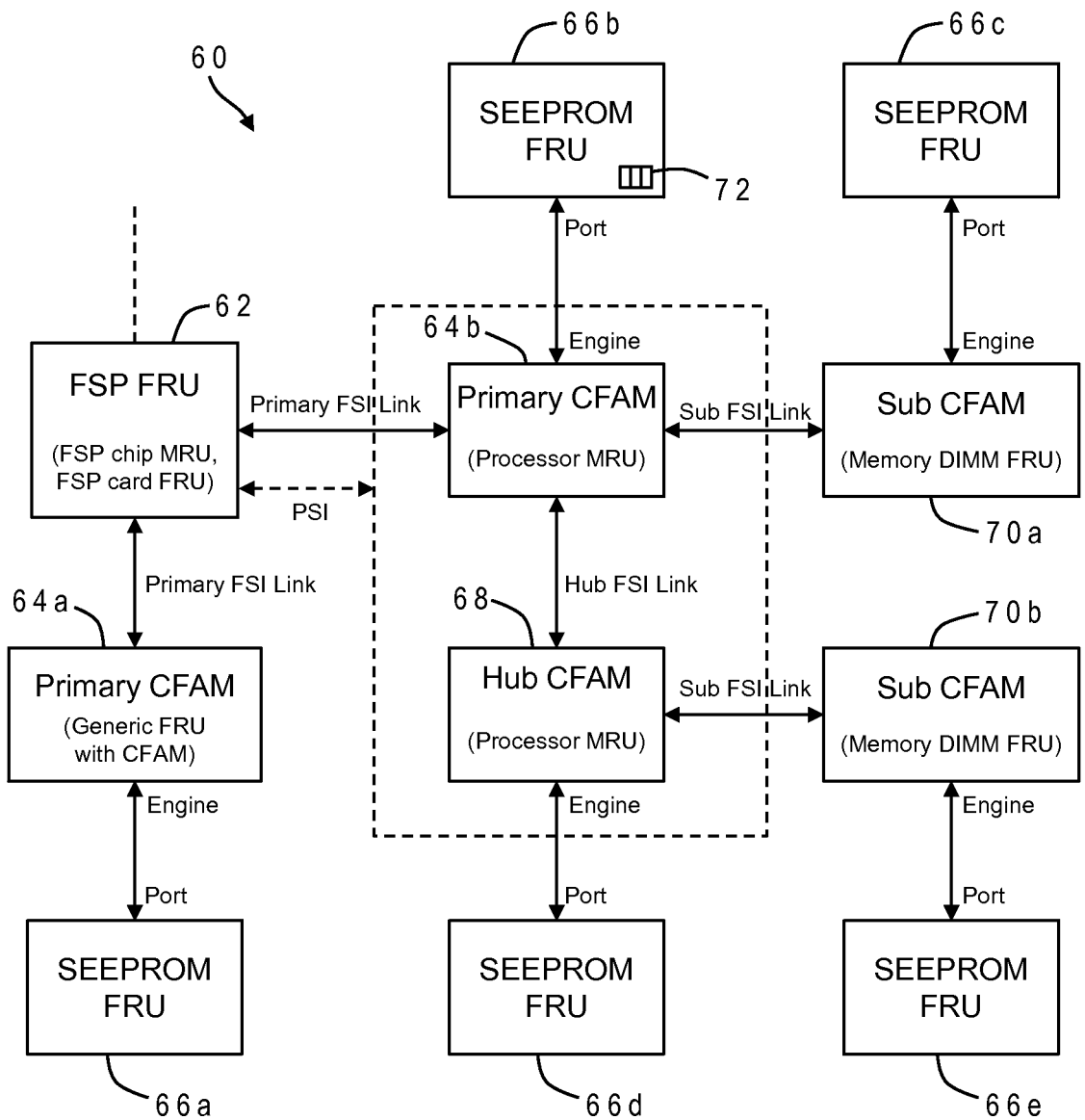
FIG. 3 is one example of a device configuration having multiple FRUs and CFAMs for which the present invention can provide fault isolation in accordance with one implementation.

Referring now to FIG. 3, a specific example is provided for fault isolation according to one implementation of the present invention, using a device configuration 60 having multiple FRUs and CFAMs. Device configuration 60 is part of a larger system, for example, connected to computer system 20 of FIG. 2 via the FSPs 34. Device configuration 60 includes a multitude of devices several of which are serially-connected using FRU support interface (FSI) links. An FSP 62 is connected via primary FSI links to two primary CFAMs 64a, 64b. FSP 62 is an FRU, and may constitute an FSP chip MRU residing on an FSP card FRU. Primary CFAM 64a is a generic FRU with a CFAM (such as a clock card FRU), whose engine is connected to the port of a serial electronically-erasable programmable read-only memory (SEEPROM) 66a (FRU) holding vital product data (VPD). A SEEPROM chip is essentially an EEPROM device that uses a serial interface. Primary CFAM 64b is part of a processor (MRU), and is connected via a hub FSI link to a hub CFAM 68, also part of another processor (MRU), and connected via a sub FSI link to a sub CFAM 70a. Alternatively, primary CFAM 64b and hub CFAM 68 may be configured as a single FRU (having processor chips as MRUs) as indicated by the dashed line, in which case the connection with FSP 62 can be a processor support interface (PSI) link. The engine of primary CFAM 64b is also connected to the port of another SEEPROM 66b (FRU). The engine of sub CFAM 70a is connected to the port of a third SEEPROM 66c (FRU), and the engine of hub CFAM 68 is connected to the port of a fourth SEEPROM 66d (FRU), Hub CFAM 68 is also connected via another sub FSI link to a second sub CFAM 70b, whose engine is connected to the port of a fifth SEEPROM 66e (FRU). Any of these components may have various hardware registers, such as registers 72 shown for SEEPROM 66b, containing state data or other information that can be used later to determine first failure data and/or a logical error identifier.

According to this example, a device operation requested by application firmware running on an FSP is initiated by opening the device with a device path. This device path indicates the source and target of the device operation as well as the path to communicate with the target. The device can be any component of the system (e.g., server), including a processor, memory, sensor, effector, etc. The path always starts with the FSP running the device driver (the device driver is stored in local memory of the FSP). Further to this example, the source of the device operation is FSP 62 and the destination (target) is SEEPROM 66e, so the path is: FSP 62→primary CFAM 64b→hub CFAM 68→sub CFAM 70b→IIC engine port→SEEPROM 66e. This path includes the following FRUs: FSP, FSP cables, backplane extension, central electronic complex (CEC) planar, processor dual-chip module (DCM), and ultimately the endpoint DIMM. The MRU list would include individual processors within the DCM as well as the FSP chip and the memory controller chip (e.g., Centaur) on the SEEPROM. Conventional fault isolation might result in the need to replace all of these components, but by including the system model data warehouse of wiring data the invention, implemented in a device driver (with a device abstraction layer) running on FSP 62, can algorithmically mine the callouts end-to-end before returning to application. The logical error identifier can be used to limit the service costs. Further to this example, all of the FSI chaining is reported to have properly worked, so the logical error identifier indicates that the failure is limited to a failure at an end port. In this case, data mining results in callouts for just the wiring on the end port, that is, a single Centaur DIMM.

A significant advantage of the present invention is that the data mining can be portable as well. The data warehouse may have data that is irrelevant to the fault isolation algorithms, and it is undesirable to mine system specific data that would inhibit direct function of this logic on future boxes. For instance, the system model may define a class='card', a type='processor', and a model='brazos', but these model specific fields should not be consumed since updates would be required to port algorithms to other models. As a specific example, memory controllers are packaged on the DIMMs for certain memory chips; however, industry standard JEDEC DIMMs would have the memory controllers packaged elsewhere like the planar. Data mining FRU callout output on that type system would yield both a planar and a DIMM callout rather than just the DIMM callout indicated above. Thus, the present invention does not require any change in the isolation algorithm, but rather requires only a change in the compile-time data warehouse system model.

Those skilled in the art will appreciate that the present invention may result in the same or different callouts for a given logical error identifier, depending on the system model. These differences can be seen with the examples of different system models shown in FIGS. 4A-4C which can be described using the same device path. In each of these three models the path is to a vital product data (VPD) chip, and can be represented in a Linux system as "/dev/iic/LINK00BUS02 @0xA0" (Linux device drivers are organized by directories of the computer's file system, so different naming conventions may be used). For example, the prefix descriptor "LINK00" refers to a particular FSI link, and the descriptor "BUS02" is a bus, i.e., port 2 (an IIC engine can drive multiple ports). The descriptor "0xA0" refers to a multi-drop bus device address.

In system model 1 seen in FIG. 4A, an FSP chip (not an FRU) is connected to a planar (FRU), which is in turn connected to a PCI adaptor (FRU), which is finally connected to the VPD chip. In the case where the error identifier isolates to an FSP chip, the callout for model 1 would be the planar FRU. In system model 2 seen in FIG. 4B (a multi-planar system), the FSP chip is connected to an FSP card (FRU), which is connected to an I/O planar (FRU), which in turn is connected to a disk controller (FRU), which is finally connected to the VPD chip. In the case where the error identifier again isolates to an FSP chip, the callout for model 2 would be the FSP card. In system model 3 seen in FIG. 4C (a multi-enclosure system), the FSP chip is connected to an FSP card (FRU), which is connected to a planar (FRU), which in turn is connected to an air mover fan (FRU), which is finally connected to the VPD chip. In the case where the error identifier again isolates to an FSP chip, the callout for model 3 would also be the FSP card.

More complicated examples may be understood with reference to FIGS. 5A-5C which show different FSI chains for a path to a first memory DIMM. These paths can again be described using a single device path, in this case, "/dev/iic/LINK02:LINK01:LINK03BUS00". In system model 4 seen in FIG. 5A, an FSP chip is connected to a planar (FRU), which is in turn connected to a first dual-chip module (FRU), which is in turn connected to a first processor (MRU, LINK02), which is in turn connected to the first DCM (FRU), which is in turn connected to the planar (FRU), which is in turn connected to a second DCM (FRU), which is in turn connected to a second processor (MRU, LINK01), which is in turn connected to the second DCM (FRU), which is in turn connected to the planar (FRU), which is in turn connected to the DIMM (FRU), which is finally connected to the VPD chip (LINK03BUS00). In system model 5 seen in FIG. 5B, an FSP chip is connected to an FSP card (FRU), which is in turn connected to an I/O planar (FRU), which is in turn connected to a CPU planar (FRU), which is in turn connected to a first DCM (FRU), which is in turn connected to a first processor (MRU, LINK02), which is in turn connected to the first DCM (FRU), which is in turn connected to the CPU planar (FRU), which is in turn connected to a second DCM (FRU), which is in turn connected to a second processor (MRU, LINK01), which is in turn connected to the second DCM (FRU), which is in turn connected to the CPU planar (FRU), which is in turn connected to the DIMM (FRU), which is finally connected to the VPD chip (LINK03BUS00). In system model 6 seen in FIG. 5C, an FSP chip is connected to an FSP card (FRU), which is in turn connected to a system node planar (FRU), which is in turn connected to a CEC node planar (FRU), which is in turn connected to a first single-chip module (FRU), which is in turn connected to a first processor (MRU, LINK02), which is in turn connected to the first SCM (FRU), which is in turn connected to the CEC node planar (FRU), which is in turn connected to a second SCM (FRU), which is in turn connected to a second processor (MRU, LINK01), which is in turn connected to the second SCM (FRU), which is in turn connected to the CEC node planar (FRU), which is in turn connected to the DIMM (FRU), which is finally connected to the VPD chip (LINK03BUS00).

In cases where the logical error identifier isolates to an FSP chip, the callouts for model 4 would be only the planar FRU, but for models 5 and 6 the callouts would be the FSP card FRU. In cases where the error identifier isolates to a primary link CFAM, callouts would be: planar and DCM for model 4; FSP card, I/O planar, CPU planar, and DCM0 for model 5; and FSP card, system node planar, CEC node planar, and DCM0 for model 6. In cases where the logical error identifier isolates to a hub link CFAM, callouts would be: planar, DCM0, and DCM1 for model 4; CPU planar, DCM0 and DCM1 for model 5; and CEC node planar, DCM0, and DCM1 for model 6. In cases where the logical error identifier isolates to a sub link CFAM, callouts would be: planar, DCM1, and DIMM for model 4; CPU planar, SCM1, and DIMM for model 5; and CEC node planar, SCM1, and DIMM for model 6. In cases where the logical error identifier isolates to PORT, callouts would be only the DIMM for all three models.

In contrast, legacy callouts (end-to-end) that would be required without the benefit of the isolation identifier would be: planar, DCM0, DCM1, DIMM for model 4; FSP card, I/O planar, CPU planar, DCM0, DCM1, and DIMM for model 5; and FSP card, system node planar, CEC node planar, SCM0, SCM1, and DIMM for model 6. It can thus be seen that the present invention advantageously saves not only parts which are fine and should not be removed, but also saves the customer time in the field replacement operations.

Figure 6:
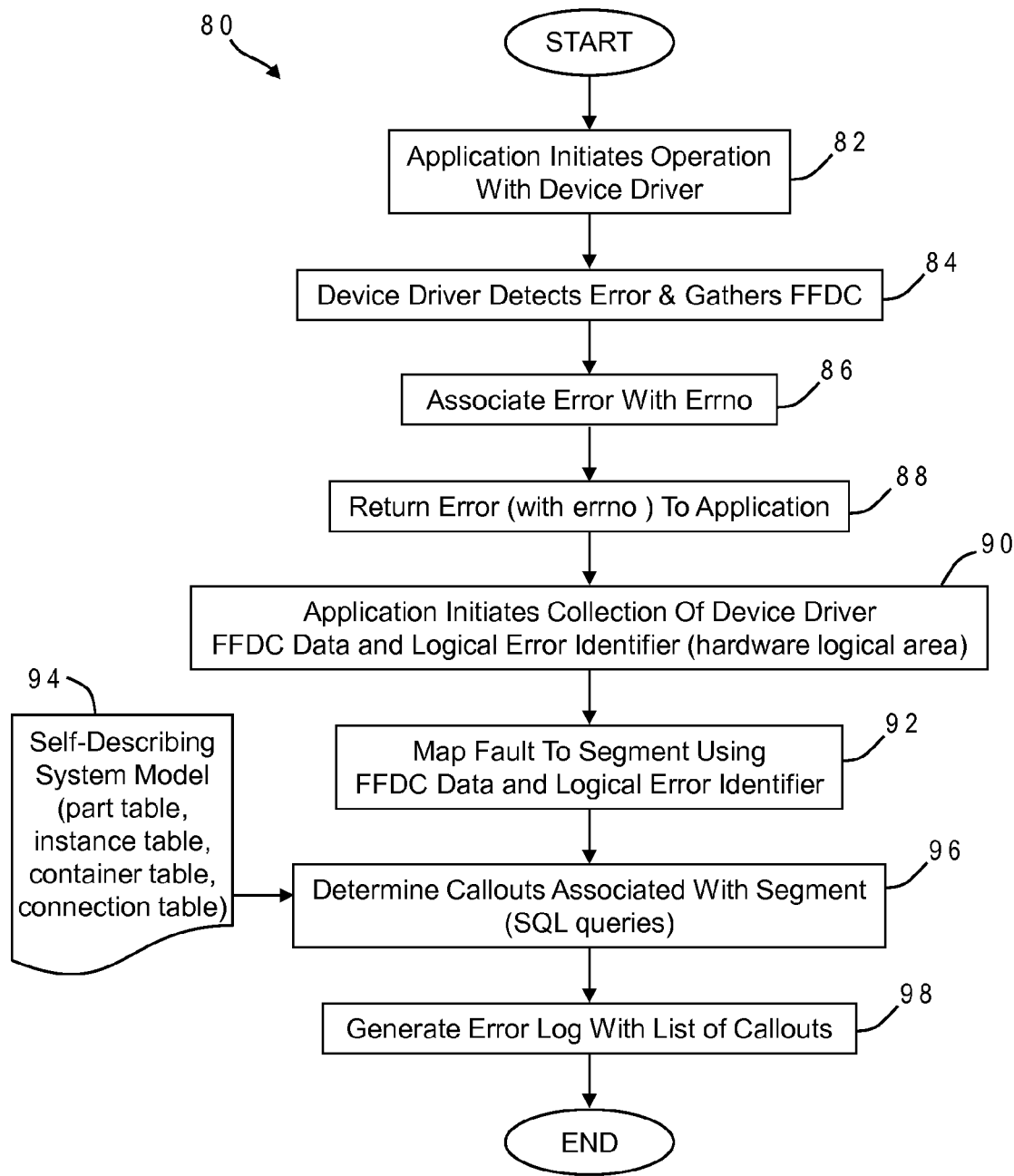
FIG. 6 is a chart illustrating the logical flow for a fault isolation process in accordance with one implementation of the present invention which uses a logical error identifier and a self-describing system model to map the fault to a specific segment of the system.

The invention may be further understood with reference to the chart of FIG. 6 illustrating the logical flow for a fault isolation process 80 which identifies possibly problematic FRUs in accordance with one implementation. The process begins when application firmware running on an FSP initiates an operation with a device driver (82). For example, the operation may have been directed to an I2C engine along an FSI chain. The device driver has a standard set of instructions for controlling operations of the particular device, including error handling, in addition to the novel fault isolation logic of the present invention. The device driver preferably includes the device abstraction layer in a user space interfacing with the kernel device driver as seen in FIG. 2. The device driver detects the error and begin first failure data capture (84). The device driver locks the interface and sets up a POSIX compliant errno which identifies the nature or type of error by conventional means (86). For example, the errno might be "5" (EIO) corresponding to "I/O error". This standard error number does not, however, represent any information regarding functional area or location of hardware. The device driver informs the application of the error and returns the errno (88).

Figure 7:
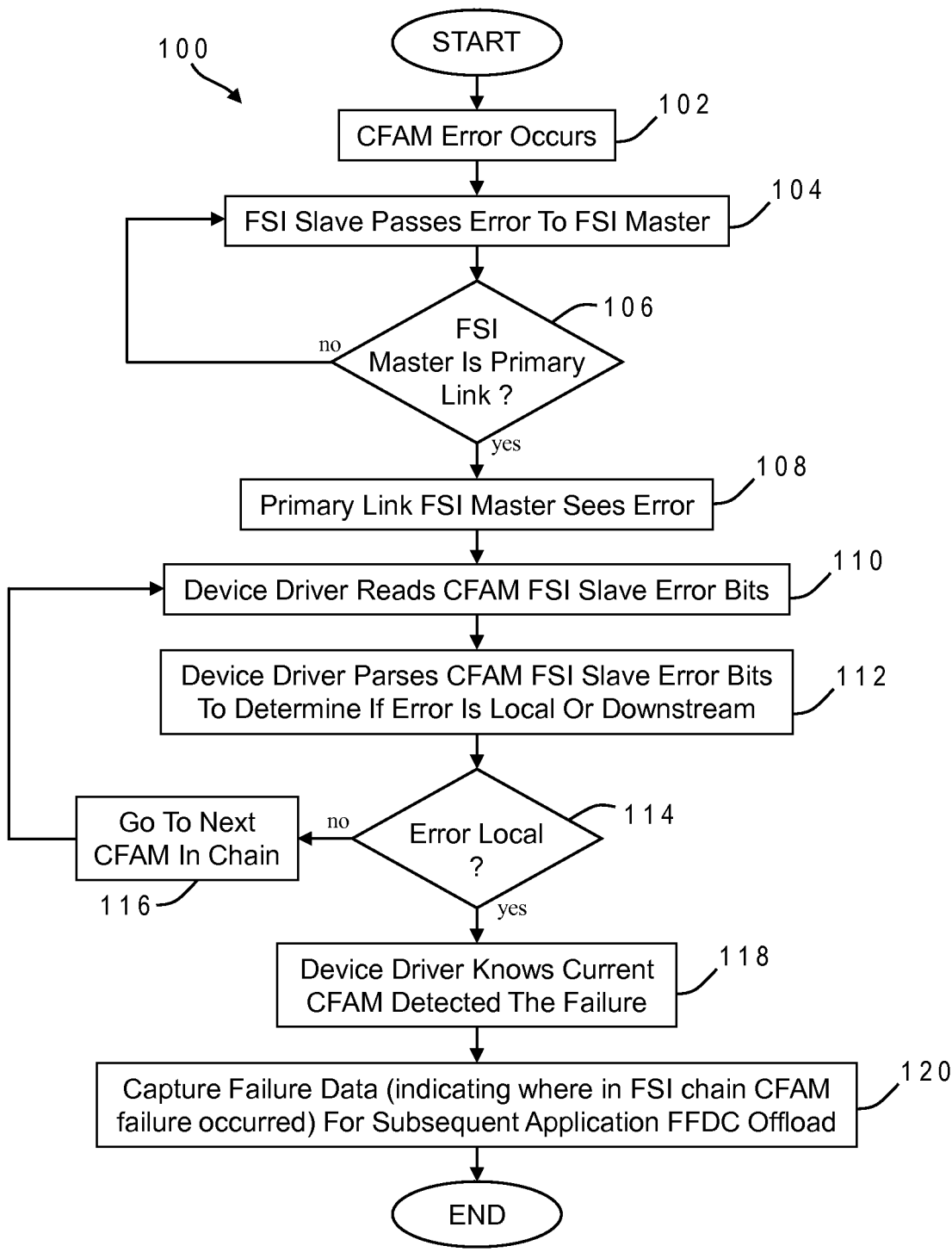
FIG. 7 is a chart illustrating the logical flow for first failure data capture in accordance with one implementation of the present invention.
Figure 8:
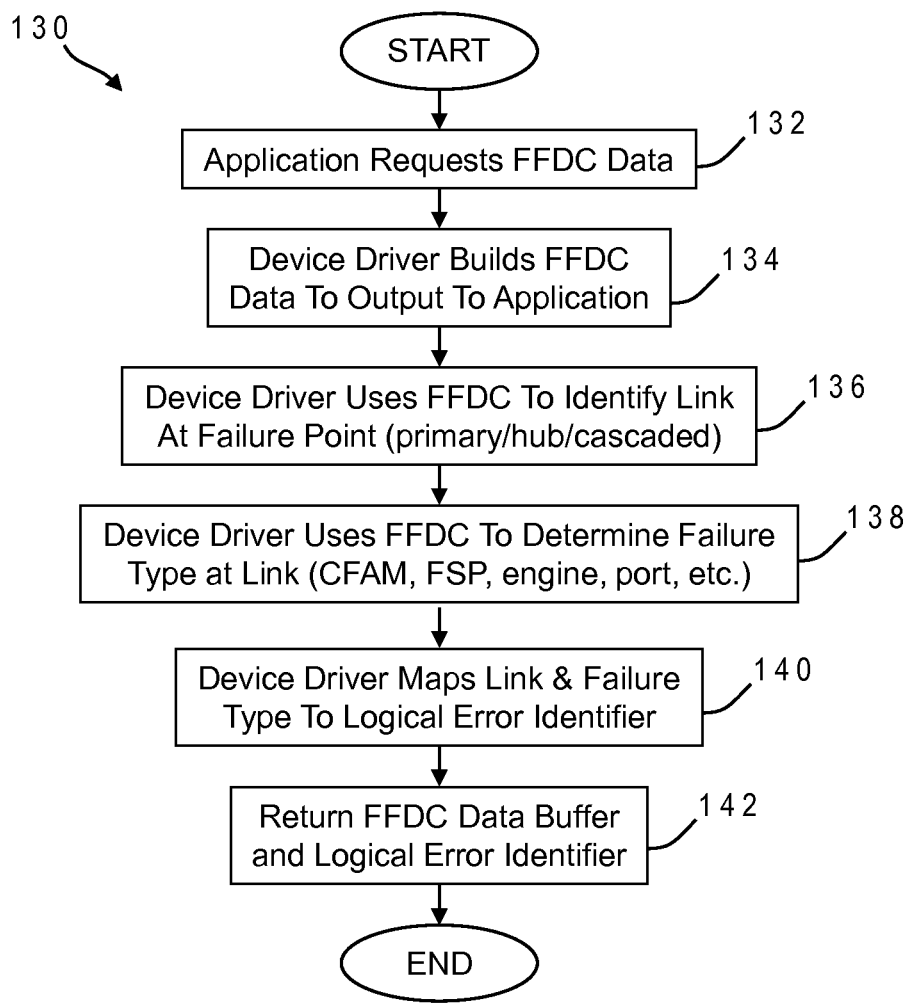
FIG. 8 is a chart illustrating the logical flow for an analysis process in accordance with one implementation of the present invention which generates the logical error identifier using fault isolation logic embedded in a device driver.

The application then initiates collection of device driver FFDC data and the logical error identifier (90), detailed further below in conjunction with FIGS. 7 and 8. The logical error identifier can be an integer or a structure, and is returned during device driver FFDC. A hardware logical area is not a specific hardware object, but rather delineates an area of the system design in terms of logical interconnections of hardware. The logical error identifier is derived from FFDC data the device driver collects at the time of failure. Within this data are hardware register and internal state contents. Device driver code performs analysis on this information, attempting to pinpoint a particular region of hardware that is responsible for the problem. At this point in a failure path, the user space device driver code has the interface FFDC and the new logical error identifier representing a hardware logical area. This information is then used to map the failure to callouts (92).

The data needed to map callouts is based on the wiring of the systems and the FRU boundary relationships with that data. In the exemplary implementation this data is included in the FSP flash memory via a SQLite database system model (94). The self-describing system model is generated during FSP firmware compilation. The hardware team can use schematics of cards to generate XML representations of wiring and a bill of materials (e.g., chips) of a card. The hardware team can also provide packaging relationships such as chip-unit, card-chip, card-card relationships, and assembly relationships to determine FRU/CRU and MRU boundaries. During compile time, all the hardware information is processed to generate the self-describing system model. Given a device path, one can mine the data out of the system model to follow the wiring from the source to the target. Given a logical error identifier, this mined data can be further refined to just the device path segments involved in the fault which lead to the error.

Once the segment of the computer has been identified, the FRU callouts are determined using the data-driven and wiring-based system model (96). The data mining can be accomplished via SQL queries, and logic follows the wiring from the source to the destination target. System model schema or data definition may contain various tables, and the queries use these tables to follow the desired connection. The core of the model could for example define tables for (i) a part, which will describe a unique part in the system, differentiating between various parts using a class attribute, (ii) an instance which will have instances of parts in the system, (iii) a container representing an association between two instances that share a containment relationship, and (iv) a connection, i.e., an association between two instances that share a connection relationship. When an FSI link is populated on a card, a record can be inserted into the connection table with class equal to 'fsi' that has two foreign keys pointing to the source and destination unit instance records. In this case, the source unit is an FSI master within an FSP chip (or a processor CFAM) and the destination unit is a CFAM. The SQL queries used for FRU callouts can capture the connection information for a problematic FSI link and source or destination of the connection for FRUs using these tables. The callout identifier is specifically mapped to the particular connection or to the source or destination of the connection. Since the input device path will give the identity of the end device, the queries acquire information on the end unit (target device engine) from the system model and will try to get the source of the connection of the CFAM with the end unit. The system model is therefore used to move up iteratively until the problematic FRU or link is reached as indicated by the logical error identifier. The queries can be different for different logical error identifiers.

Once the callouts have been determined they can be added to an error log which will initiate a service call to replace the FRUs (98). The error log can have complete details of the FRUs to be called out, such as serial number, part number, location code, MRU details, etc. The error log can be generated prior to returning to the requesting application. After generating the error log, the device driver can unlock the device interface and the process ends.

FFDC can be accomplished by a variety of means. One approach is depicted in FIG. 7 in accordance with one implementation of the invention. The process 100 begins with the occurrence of a CFAM error (102). The FSI slave in the CFAM where the error signal occurred passes the error to its upstream FSI master (104). If the FSI master is not a primary link (106), the process iteratively returns to box 104 with the current slave passing the error up the chain to the next FSI master. This action continues until the FSI at a primary link sees the error (108). The device driver then reads the CFAM FSI slave error bits (110), and parses them to determine if the error is local (at the current CFAM) or downstream (112). The CFAM error bits include, among others, an indicator of whether the error originally arose at this CFAM or it was passed up from elsewhere in the chain. If the error is not local (114), the device driver advances to the next CFAM in the chain (116) and the process iteratively returns to boxes 110 and 112 to parse the next set of FSI slave error bits. Once the error is identified as being local, the device driver knows it is at the CFAM which originally detected the failure (118). The device driver can then capture the failure data for subsequent application FFDC offload (120).

As noted above, the logical error identifier can be derived from failure data. FIG. 8 illustrates a flow chart for the process 130 which carries out this analysis in accordance with one implementation of the invention. Process 130 generally corresponds to box 90 of FIG. 6. The analysis begins with the application requesting FFDC data (132). The device driver responsively builds the FFDC data for output to the application (134). Box 134 generally corresponds to process 100 of FIG. 7. The device driver then uses the FFDC to identify the link at the failure point (136), i.e., primary, hub or cascaded, and to determine the failure type at the link (138), i.e., CFAM, FSP, engine, port, etc., according to the particular boundary schema employed. The device driver can map the link and failure type to a specific logical error identifier (140) which is then returned with the FFDC data buffer to the caller (142). Different embodiments may map differently, for example, a failure link may be mapped to one nibble or byte and the failure type to another nibble/byte.

Table 1 provides an exemplary list of logical error identifiers for different hardware logical areas in accordance with one implementation of the invention.

TABLE 1

| Logical Error Identifier | Hardware Logical Area |
|---|---|
| 2 | primary FSI link |
| 3 | primary CFAM |
| 4 | secondary (hub) FSI link |
| 5 | secondary (hub) CFAM |
| 6 | cascaded (sub) FSI link |
| 7 | remote (sub) CFAM |
| 8 | engine (e.g., IIC) |
| 11 | FSP |

The present invention thereby provides a robust method to efficiently build an FRU callout list for all the varied interfaces found in a complex FSI chain design, encapsulated within the functionality of the device driver. Since the fault isolation code is driven by the customized data in the self-describing system model, there is no need to update the firmware when a new platform is designed. In addition to this forward compatibility, the invention avoids device loading issues and connector constraints.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described in the context of FSPs, FSI links and CFAMs, but it would be equally applicable to other systems and interconnects that provide serial connections between devices representing logical hardware areas according to that system schema. It is therefore contemplated that such modifications can be made without departing from the spirit or scope of the present invention as defined in the appended claims.

What is claimed is:

1. A method of isolating a fault in a computer system comprising:

detecting an error in the computer system using a device driver installed in the computer system which controls an electronic device of the computer system, the electronic device being one of a plurality of devices which include multiple field replaceable units and are interconnected using a plurality of serial links adapted for interconnecting the field replaceable units;

analyzing the error using fault isolation logic embedded in the device driver to determine first failure data and a logical error identifier for the error, wherein the logical error identifier represents a hardware logical area of the fault;

associating the error with an error number using the device driver, wherein the error number represents an error type, and the logical error identifier is different from the error number; and mapping the fault to a segment of the computer system using the first failure data and the logical error identifier based on a self-describing system model for the computer system which is stored in a memory device of the computer system.

2. The method of claim 1 wherein:

the serial links include FRU support interface links;

the computer system includes a flexible service processor in communication with the electronic device via a chain of the FRU support interface links; and operation of the device driver is carried out by the flexible service processor.

3. The method of claim 1 wherein said analyzing includes the device driver:

using the first failure data to identify a link at a failure point corresponding to the fault;

using the first failure data to determine a failure type at the link; and mapping the link and the failure type to the logical error identifier.

4. The method of claim 1 wherein the self-describing system model includes field replaceable unit boundary relationships for the plurality of interconnected devices.

5. The method of claim 1 further comprising generating a list of callouts of certain ones of the field replaceable units that are associated with the segment.

6. The method of claim 5 wherein:

the self-describing system model includes a plurality of tables including a part table uniquely identifying particular parts using a class attribute, an instance table identifying the plurality of devices as specific instances of the parts, a container table representing associations between instances that share a containment relationship, and a connection table associating instances that share a connection relationship; and said generating includes iteratively querying the tables to identify the certain field replaceable units.

7. A method of isolating a fault in a computer system comprising:

detecting an error in the computer system using a device driver installed in the computer system which controls an electronic device of the computer system, the electronic device being one of a plurality of devices which include multiple field replaceable units and are interconnected using a plurality of serial links adapted for interconnecting the field replaceable units;

analyzing the error using fault isolation logic embedded in the device driver to determine first failure data and a logical error identifier for the error, wherein the logical error identifier represents a hardware logical area of the fault; and mapping the fault to a segment of the computer system using the first failure data and the logical error identifier based on a self-describing system model for the computer system which is stored in a memory device of the computer system, wherein said analyzing includes the device driver:

using the first failure data to identify a link at a failure point corresponding to the fault;

using the first failure data to determine a failure type at the link; and mapping the link and the failure type to the logical error identifier.

8. A method of isolating a fault in a computer system comprising:

detecting an error in the computer system using a device driver installed in the computer system which controls an electronic device of the computer system, the electronic device being one of a plurality of devices which include multiple field replaceable units and are interconnected using a plurality of serial links adapted for interconnecting the field replaceable units;

analyzing the error using fault isolation logic embedded in the device driver to determine first failure data and a logical error identifier for the error, wherein the logical error identifier represents a hardware logical area of the fault; and mapping the fault to a segment of the computer system using the first failure data and the logical error identifier based on a self-describing system model for the computer system which is stored in a memory device of the computer system, wherein the self-describing system model includes field replaceable unit boundary relationships for the plurality of interconnected devices.

* * * * *